June 19, 1951 R. T. HOSKING 2,557,288
LOCK WASHER
Filed Nov. 12, 1948
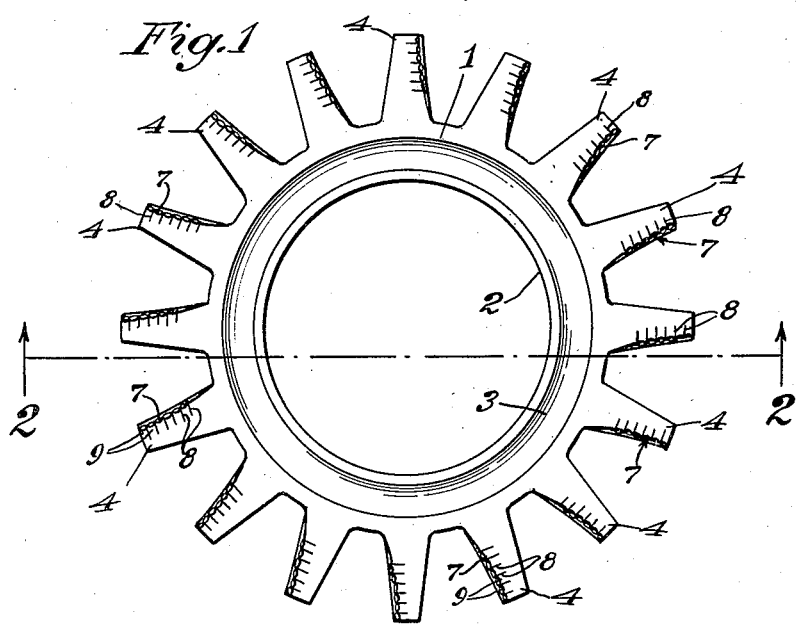
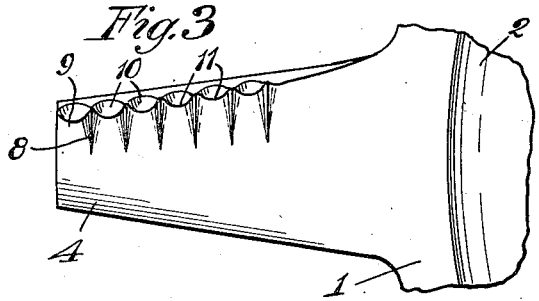
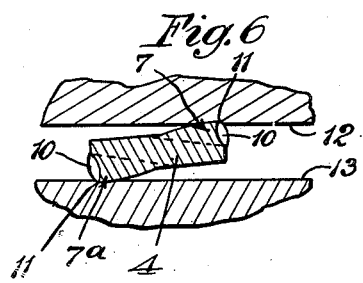
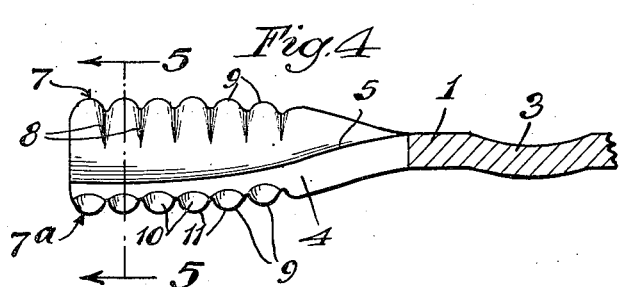
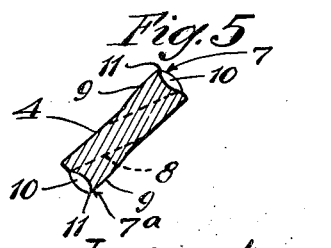
Inventor
Richard T. Hosking, Deceased, By
Lola Carpenter Hosking, Executrix
by Parker & Carter
Attorneys Patented June 19, 1951

2,557,288

UNITED STATES PATENT OFFICE 2,557,288

LOCK WASHER

Richard T. Hosking, deceased, late of Wilmette, Ill., by Lola Carpenter Hosking, executrix, Wilmette, Ill., assignor to H. R. Hough Company, Chicago, Ill., a corporation of Illinois Application November 12, 1948, Serial No. 59,697

3 Claims. (Cl. 151—35)

This invention relates to improvements in nut locks and has for one object to provide a new and improved form of nut lock or lockwasher which will effectively prevent uncrewing of a nut, which will retain its locking characteristics under conditions of vibration and pressure, and which can be manufactured with a minimum of expense.

Other objects will appear from time to time in the specification.

The invention is illustrated more or less diagrammatically in the accompanying drawings wherein:

Figure 1 is a plan view;

Figure 2 is a section along the line 2—2 of Figure 1;

Figure 3 is a plan view on an enlarged scale of one of the locking fingers of the washer;

Figure 4 is an edge view of the fingers shown in Figure 3;

Figure 5 is the section along the line 5—5 of Figure 4; and

Figure 6 is a section similar to Figure 5, but showing the locking finger under compression.

Like parts are indicated by like numbers in the specification and drawings.

1 is an annular washer of thin section centrally apertured at 2 to encircle a bolt or stud. 3 is an annular corrugation or thickening element encircling the aperture 2 formed in the body of the washer. 4 indicates a plurality of tapered radial locking fingers. Each finger is twisted, as indicated especially clearly at 5 in Figure 2, so that the twisted fingers occupy the space indicated at 6 greater than the thickness of the stock of which the washer is made and also greater than the overall thickness of the washer at the annular reinforcing or thickening corrugation 3.

The opposed upper and lower edges of the washer are upset as indicated at 7 and 7a. This upsetting may be accomplished by a coining pressure operation so as to provide a series of generally tangent grooves 8 with raised portions 9 between the grooves. This results in drawing out the face of the finger so as to associate with each raised portion 9 between the grooves an area 10 bounded by a curved cutting wall 11.

When the washer is compressed between a nut and the surface opposed to the nut, each of the twisted fingers is rotated from the position shown in Figure 5 to the position shown in Figure 6. Under these circumstances, the cutting edges 11 are brought into opposing contact with the surface of the nut on one side and with the abutment opposed to the nut on the other, and each tooth tends to dig into the metal at the point of contact thereby resisting rattling loose of the nut.

The reinforcing corrugation 3 is formed so that even under maximum pressure the twisted fingers are never brought down into complete parallelism with the opposed surfaces 12 and 13; thus, the cutting edges are always inclined to the opposed surfaces and always bite into the metal and the fingers are never brought back into parallelism with the washer itself and thus are not stressed beyond the elastic limit so that the lockwasher may be used again and again.

It will be realized that, whereas there has been illustrated and described a practical and operative device, still many changes may be made in the size, shape, arrangement, number and disposition of parts without departing materially from the spirit of the invention. It is wished, therefore, that the description and drawing be taken as in a large sense illustrative and diagrammatic, rather than as limiting to the precise showing.

What is claimed is:

1. A centrally apertured lockwasher, radial fingers extending outwardly from the washer, the fingers being twisted about radial axes, a portion of the washer being of greater thickness than the thickness of the fingers, a plurality of work engaging teeth along the opposed edges of the twisted fingers.

2. A centrally apertured lockwasher, an annular corrugation encircling the central aperture and increasing the overall thickness of the washer above the thickness of the stock of which it is made, radial fingers extending outwardly beyond the corrugation, the fingers being twisted about radial axes, the upper and lower edges of the fingers being upset to form a plurality of cutting teeth spaced along each edge, each cutting tooth having a curved work engaging edge.

3. A centrally apertured lockwasher an annular corrugation encircling the central aperture and increasing the overall thickness of the washer above the thickness of the stock of which it is made, radial fingers extending outwardly beyond the corrugation, the fingers being twisted about radial axes, the upper and lower edges of the fingers being upset to form a plurality of cutting teeth spaced along each edge, each cutting tooth having a curved work engaging edge, the face of the finger enclosed by the curved work engaging edge being concave.

LOLA CARPENTER HOSKING,
*Executrix of the Last Will and Testament of Richard T. Hosking, Deceased.*

REFERENCES CITED

The following references are of record in the file of this patent:

UNITED STATES PATENTS

| Number | Name | Date |
|---|---|---|
| 1,323,188 | Humphris | Nov. 25, 1919 |
| 1,824,991 | Gribbie | Sept. 29, 1931 |
| 2,236,235 | Head | Mar. 25, 1941 |
| 2,321,155 | Poupitch | June 8, 1943 |
| 2,322,776 | Poupitch | June 29, 1943 |